United States Patent [19]
Stevens

[11] Patent Number: 5,535,306
[45] Date of Patent: Jul. 9, 1996

[54] SELF-CALIBRATION SYSTEM FOR ROBOT MECHANISMS

[75] Inventor: Craig L. Stevens, Felton, Calif.

[73] Assignee: Applied Materials Inc., Santa Clara, Calif.

[21] Appl. No.: 389,090

[22] Filed: Feb. 14, 1995

Related U.S. Application Data

[63] Continuation of Ser. No. 11,043, Jan. 28, 1993, abandoned.

[51] Int. Cl.[6] .......................... G05B 19/04; G05B 19/42; G05B 19/18
[52] U.S. Cl. .................. 395/89; 395/88; 395/93
[58] Field of Search .................................. 395/89, 94, 93

[56] References Cited

U.S. PATENT DOCUMENTS

| | | | |
|---|---|---|---|
| 4,356,554 | 10/1982 | Susnjara et al. | 395/89 |
| 4,362,977 | 12/1982 | Evans et al. | 395/85 |
| 4,642,781 | 2/1987 | Szonyi | 395/89 |
| 4,702,665 | 10/1987 | Nakashima et al. | 414/730 |
| 4,710,884 | 12/1987 | Tokairin et al. | 395/89 |
| 4,725,965 | 2/1988 | Keenan | 364/513 |
| 4,753,569 | 6/1988 | Pryor | 414/730 |
| 4,763,276 | 8/1988 | Perreirra et al. | 395/97 |
| 4,806,066 | 2/1989 | Rhodes et al. | 414/729 |
| 4,819,167 | 4/1989 | Cheng et al. | 395/88 |
| 4,831,549 | 5/1989 | Red et al. | 395/89 |
| 4,852,237 | 8/1989 | Tradt et al. | 395/93 |
| 4,908,777 | 3/1990 | Wolfe | 364/513 |
| 4,945,493 | 7/1990 | Huang et al. | 364/513 |
| 4,951,601 | 8/1990 | Moydan et al. | 118/719 |
| 4,980,971 | 1/1991 | Bartschat et al. | 395/94 |
| 5,005,277 | 4/1991 | Uemura et al. | 29/407 |
| 5,162,713 | 11/1992 | Mohri et al. | 318/568.19 |
| 5,177,563 | 1/1993 | Everett et al. | 395/94 |

OTHER PUBLICATIONS

Zupancic, "A Calibrahon Technique in Robotic Assembly of Hybrid Circuits", 8th Int'l Electronic Manufacturing Symposiium, pp. 137–146, May 7–9 1990.
Joint Development Agreement Between Applied Materials, Inc. (Applicant's Assignee) and two unrelated companies (Companies A & B), dated May 29, 1991 (Exhibit A hereto).

*Primary Examiner*—Robert W. Downs
*Attorney, Agent, or Firm*—Lawrence Edelman; Noel F. Heal

[57] ABSTRACT

A method and apparatus for calibrating a robot for differences between the actual and predicted positions of a robot chamber with respect to the robot, and for differences between the actual and predicted positions of a processing chamber with respect to the robot. A substrate support on the robot is first moved angularly across a fixed sensor in the robot chamber, to detect the actual position of the sensor in terms of angle, and second is moved radially out across the fixed sensor to detect actual position in terms of radius with respect to a center of rotation. The difference, if any, between the actual and predicted positions of the sensor is used to calibrate a home position of the robot. A similar technique is used to calibrate the robot for any discrepancy between the actual and predicted positions of a processing chamber adjoining the robot chamber.

10 Claims, 11 Drawing Sheets

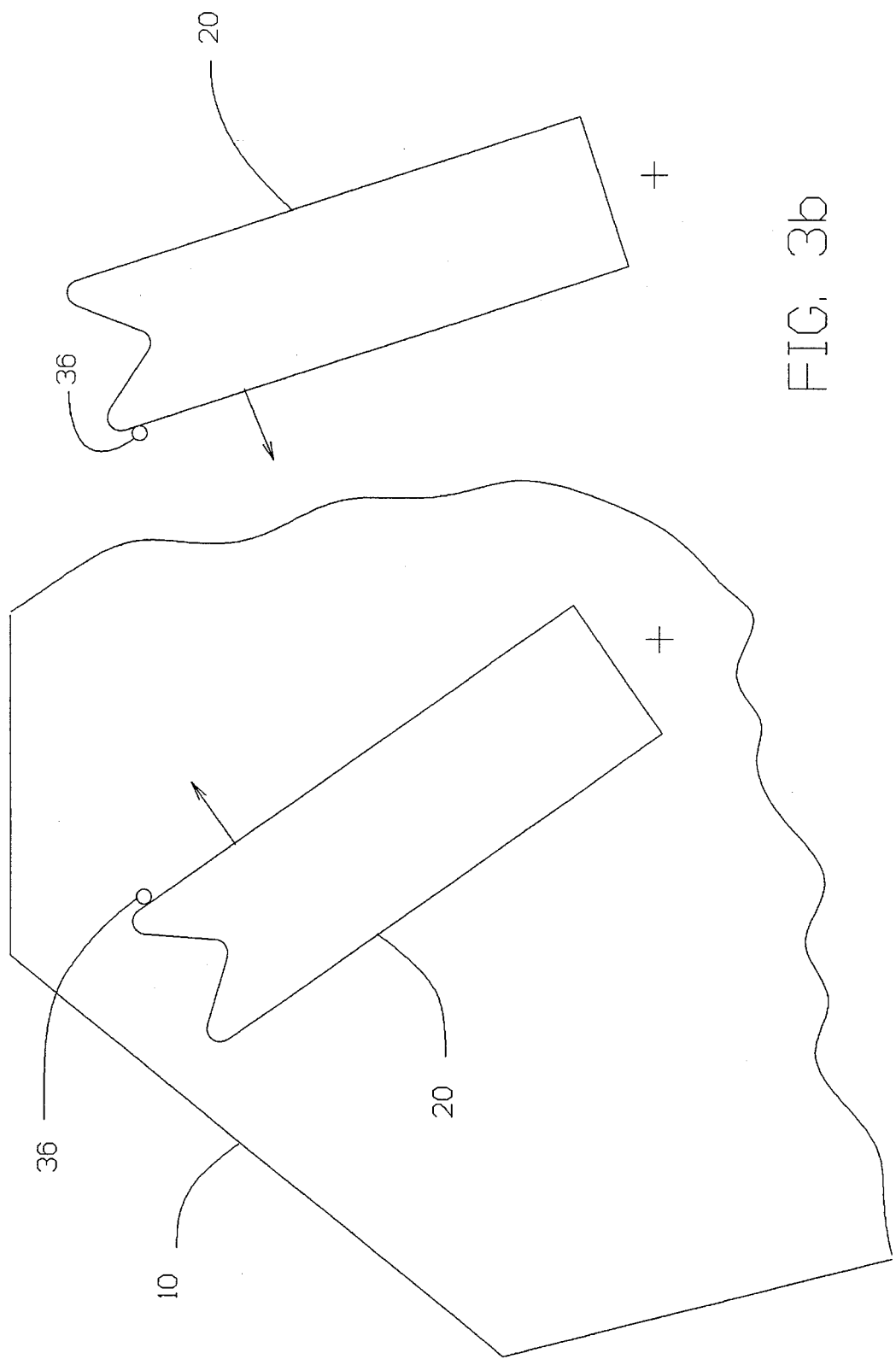

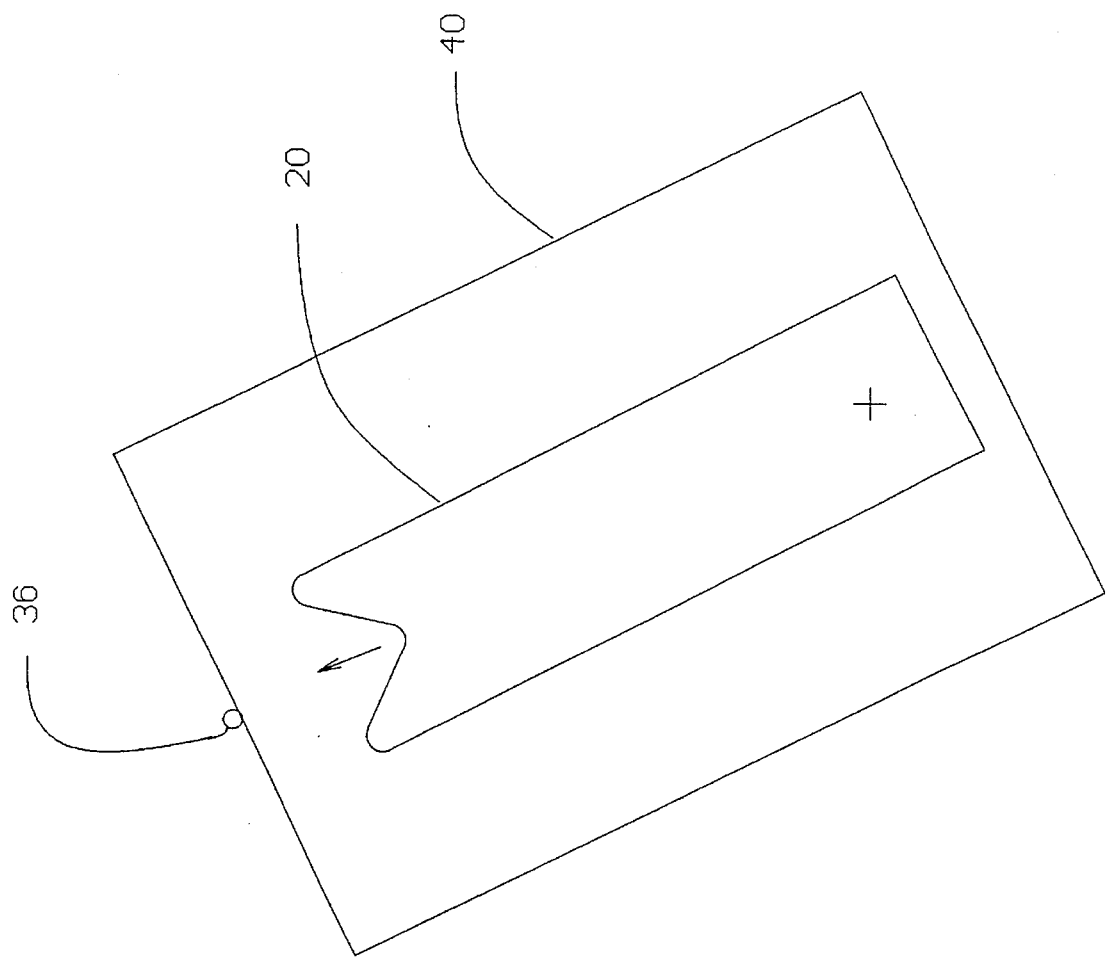

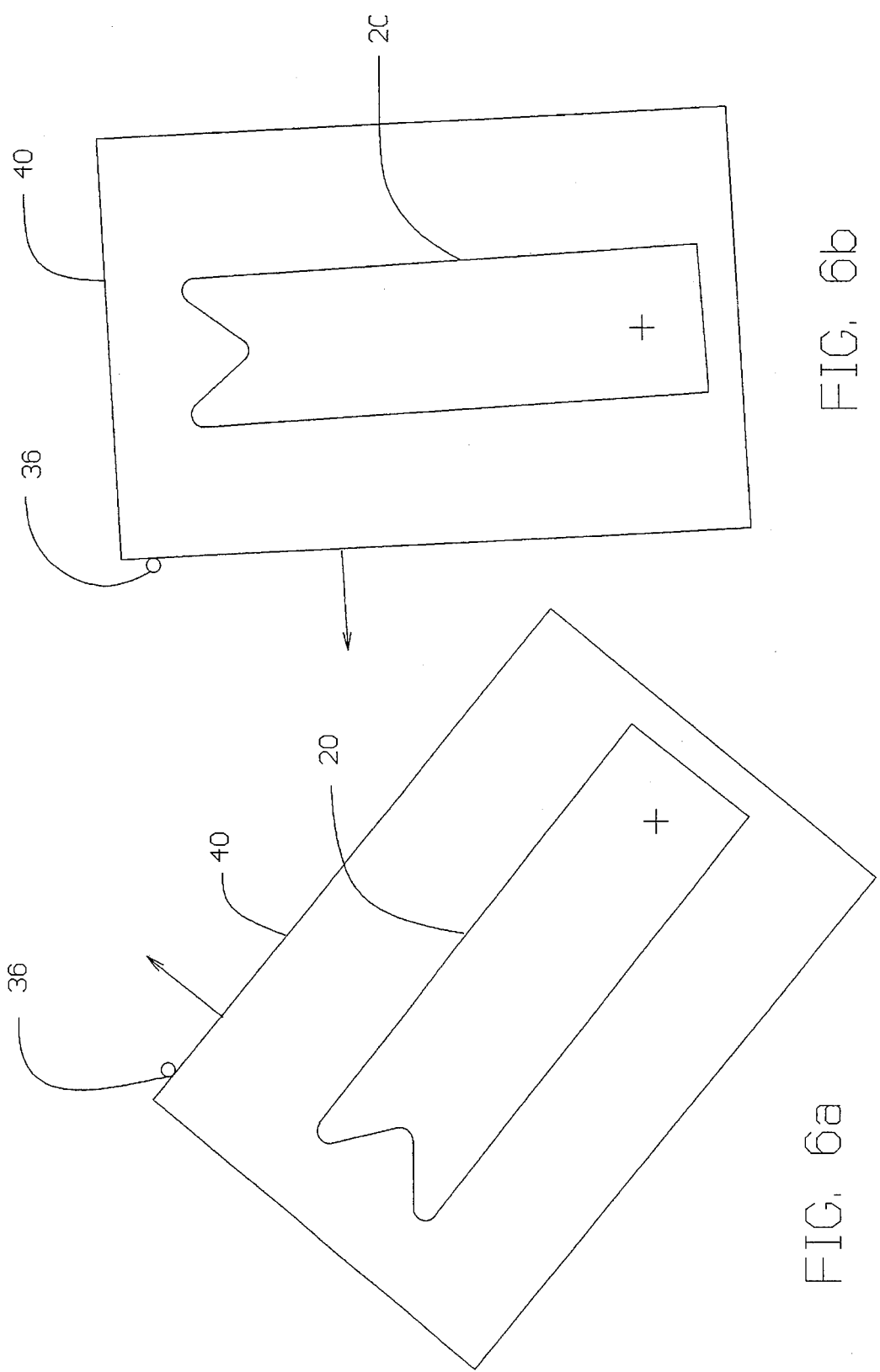

SELF-CALIBRATION SYSTEM FOR ROBOT MECHANISMS

This application is a continuation of application Ser. No. 08/011,043, filed Jan. 28, 1993, now abandoned.

BACKGROUND OF THE INVENTION

This invention relates generally to robot mechanisms for moving workpieces from one processing location to another and, more particularly, to techniques for automatically calibrating a robot mechanism after assembly or maintenance. Robot mechanisms of various designs have been employed to facilitate the movement of substrates in the fabrication of semiconductor devices. Such mechanisms can be programmed to move planar substrates between processing locations, which are usually in a vacuum or clean environment. Robot mechanisms of this general type have in common the need to be properly calibrated upon installation or after maintenance or disassembly.

Some robot control systems have a programming mode in which a mechanism is "taught" its required steps under manual control, and will then be able to perform the same steps automatically. In most manufacturing applications of robots, the sequence of steps that a robot mechanism is required to perform will be well defined. There is not usually a need for frequent reprogramming of the sequence, but there is a need for calibration of the system to account for changes in the robot mechanism's position with respect to the environment in which it operates, or for differences between actual and theoretical positions of objects in the robot's environment.

More specifically, a robot mechanism may be installed in a vacuum chamber that is surrounded by various processing chambers. The purpose of the present invention is to compensate for any differences between the actual and predicted positions of the robot mechanism with respect to the vacuum chamber and with respect to the processing chambers.

SUMMARY OF THE INVENTION

The present invention resides in a method and apparatus for calibrating a robot mechanism to compensate for differences between the actual and predicted positions of the robot with respect to a chamber in which it operates, and for differences between the actual and predicted positions of processing chambers accessed by the robot mechanism. Although the illustrative robot mechanism provides for movement in terms of polar coordinates, it will be appreciated that the principles of the invention apply also to other types of robot mechanisms.

The method of the invention provides for automatic calibration of a two-axis robot installed in a robot chamber. Briefly, and in general terms, the method comprises the steps of moving the robot to a position such that a selected robot component is positioned adjacent to a fixed sensor in the robot chamber; moving the robot component along a selected position axis and across the sensor; detecting when at least one feature of the robot component trips the sensor; and recording the robot position in the position axis along which the robot was moved across the sensor. The method also includes computing the difference between the recorded robot position and a predicted robot position at which the sensor should be tripped; and applying the difference value computed in the computing step, to calibrate the robot in the selected position axis. Similar steps are performed for the other of the robot's two position axes.

For calibration with respect to a processing chamber position, the method further includes the steps of picking up a workpiece from a selected processing chamber adjoining the robot chamber; moving the workpiece across the sensor along each position axis in turn; detecting at least one feature of the workpiece as it is moved across the sensor along each position axis; computing the difference, for each position axis, between the detected position of the workpiece and a predicted position of the workpiece; and applying the differences obtained from the computing step, to adjust a predicted position of the processing chamber.

More specifically, the invention is concerned with a robot capable of moving a substrate support in angular and radial directions with respect to an axis. The specific steps of the method include moving the robot to an angular position such that the substrate support is adjacent to a fixed sensor in the robot chamber; moving the substrate support angularly across the sensor; detecting when at least one edge of the substrate support trips the sensor, and recording the angular position of the robot; computing the difference between the recorded robot angular position and a predicted robot angular position at which the sensor should be tripped; and applying the difference value computed in the prior computing step to calibrate the robot in the angular position axis. Subsequent to these steps, the robot is calibrated in terms of radial position, following the steps of moving the substrate support such that its front edge is adjacent to the sensor; moving the substrate support radially out across the sensor; detecting when at least one feature of the front edge of the substrate support trips the sensor and recording the radial position of the robot; computing the difference between the recorded robot radial position and a predicted robot radial position at which the sensor should be tripped; and applying the difference value computed in the prior computing step, to calibrate the robot in the radial position axis.

In the illustrative embodiment of the invention, the step of detecting when at least one edge of the substrate support trips the sensor includes detecting when each of two opposite side edges of the substrate support trips the sensor, and averaging the two resultant angular positions. The step of detecting when at least one feature of the front edge of the substrate support trip the sensor includes detecting when each of two leading prongs of the front edge trips the sensor, and averaging the two resultant radial positions.

For calibration with respect to a processing chamber, the method further comprises the steps of picking up a substrate from a selected processing chamber adjoining the robot chamber; moving the substrate across the sensor in a radial direction; detecting at least one edge of the substrate as it is moved radially across the sensor; computing the difference between the detected radial position of the substrate and a predicted radial position of the substrate; and applying the difference obtained from the prior computing step, to adjust a predicted radial position of the processing chamber. For angular calibration to account for any error in the processing chamber position, the method also includes moving the substrate angularly across the sensor; detecting at least one edge of the substrate as it is moved angularly across the sensor; computing the difference between the detected angular position of the substrate and a predicted angular position of the substrate; and applying the difference obtained from the prior computing step, to adjust a predicted angular position of the processing chamber.

In terms of novel apparatus, the invention may be defined as comprising: means for moving a substrate support in the robot to a selected angular position and a selected radial position with respect to a fixed axis; a sensor fixed in the robot chamber, and capable of detecting the presence of the edge of an object moved across the sensor; and calibration control means. Specifically, the calibration control means includes means for moving the robot to an angular position such that the substrate support is positioned adjacent to the sensor; means for moving the substrate support angularly across the sensor; means for detecting when at least one edge of the substrate support trips the sensor, and recording the angular position of the robot; and means for computing the difference between the recorded robot angular position and a predicted robot angular position at which the sensor should be tripped, and applying the difference value computed in the prior computing step to calibrate the robot in the angular position axis. The calibration control means further comprises: means for moving the substrate support such that its front edge is adjacent to the sensor; means for moving the substrate support radially out across the sensor; means for detecting when at least one feature of the front edge of the substrate support trips the sensor and recording the radial position of the robot; and means for computing the difference between the recorded robot radial position and a predicted robot radial position at which the sensor should be tripped, and applying the difference value computed in the prior computing step to calibrate the robot in the radial position axis.

It will be appreciated from the foregoing that the present invention represents a significant advance in the field of calibration techniques for robots that move workpieces, such as substrates, from one processing chamber to another. In particular, the invention provides for automatic calibration of a robot to compensate for discrepancies between the actual and predicted positions of the robot with respect to a chamber in which it operates, and between the actual and predicted positions of processing chambers in which substrates are placed, and from which they are retrieved, by the robot. Other aspects and advantages of the invention will become apparent from the following more detailed description, taken in conjunction with the accompanying drawings.

BRIEF DESCRIPTION OF THE DRAWINGS

FIGS. 3a and 3b are simplified diagrams showing two important steps in a system angular calibration procedure in accordance with the invention;

FIG. 5 is a simplified diagram showing an important step in a chamber radius calibration procedure in accordance with the present invention;

FIGS. 6a and 6b are simplified diagrams showing two important steps in a chamber angular calibration procedure in accordance with the present invention;

DESCRIPTION OF THE PREFERRED EMBODIMENT

Figure 1:
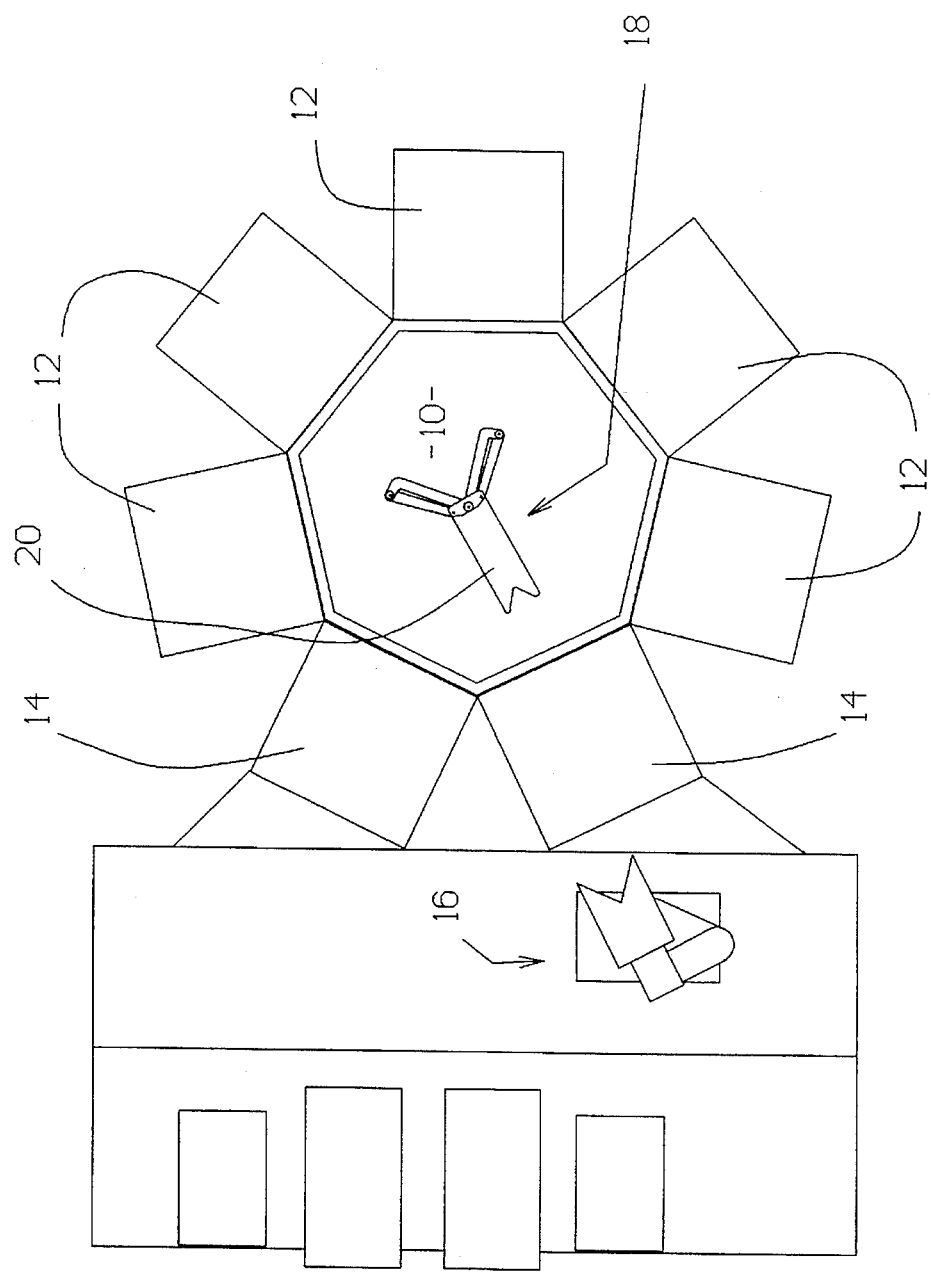
FIG. 1 is a simplified plan view of a substrate processing system in which the present invention may be usefully employed.

As shown in the drawings for purposes of illustration, the present invention is concerned with techniques for calibrating a robot mechanism to account for differences between actual and predicted positions of the robot with respect to the chamber in which it operates, and for differences between actual and predicted positions of processing chambers with respect to the robot mechanism. How these calibrations are automatically performed will be best understood in the context of a specific embodiment of a robot mechanism, as described below.

FIG. 1 shows by way of background an environment in which the invention may be used, namely a semiconductor substrate processing system in which large substrates are moved from one processing chamber to another through a centrally located vacuum or transfer chamber, indicated by reference numeral 10. The processing chambers are indicated by numeral 12, and five are shown by way of example. Details of the processes performed in the chambers 12 are not important to the present invention. They may, for example, involve various chemical vapor deposition steps performed on large rectangular glass substrates.

The processing system also includes two loadlocks 14 through which the substrates are loaded into and unloaded from the system. Basically, each loadlock 14 has two doors (not shown), one opening into the transfer chamber 10 and the other opening to atmosphere. To load substrates into the system, they are placed in one of the loadlocks 14 from the atmospheric side; then the loadlock is evacuated and is unloaded from the transfer chamber side. Loading and unloading the loadlocks 14 may be effected by a separate robot mechanism 16, but this is of no concern to the present invention.

After substrates have been placed in one of the loadlocks 14, their further movement is effected by a vacuum chamber robot 18, which removes the substrates one by one from the loadlock and places them in various processing chambers 12. Other operations of the vacuum chamber robot 18 include moving substrates from one processing chamber to another and, at the conclusion of processing, moving substrates from a processing chamber back to one of the loadlocks 14.

Figure 2:
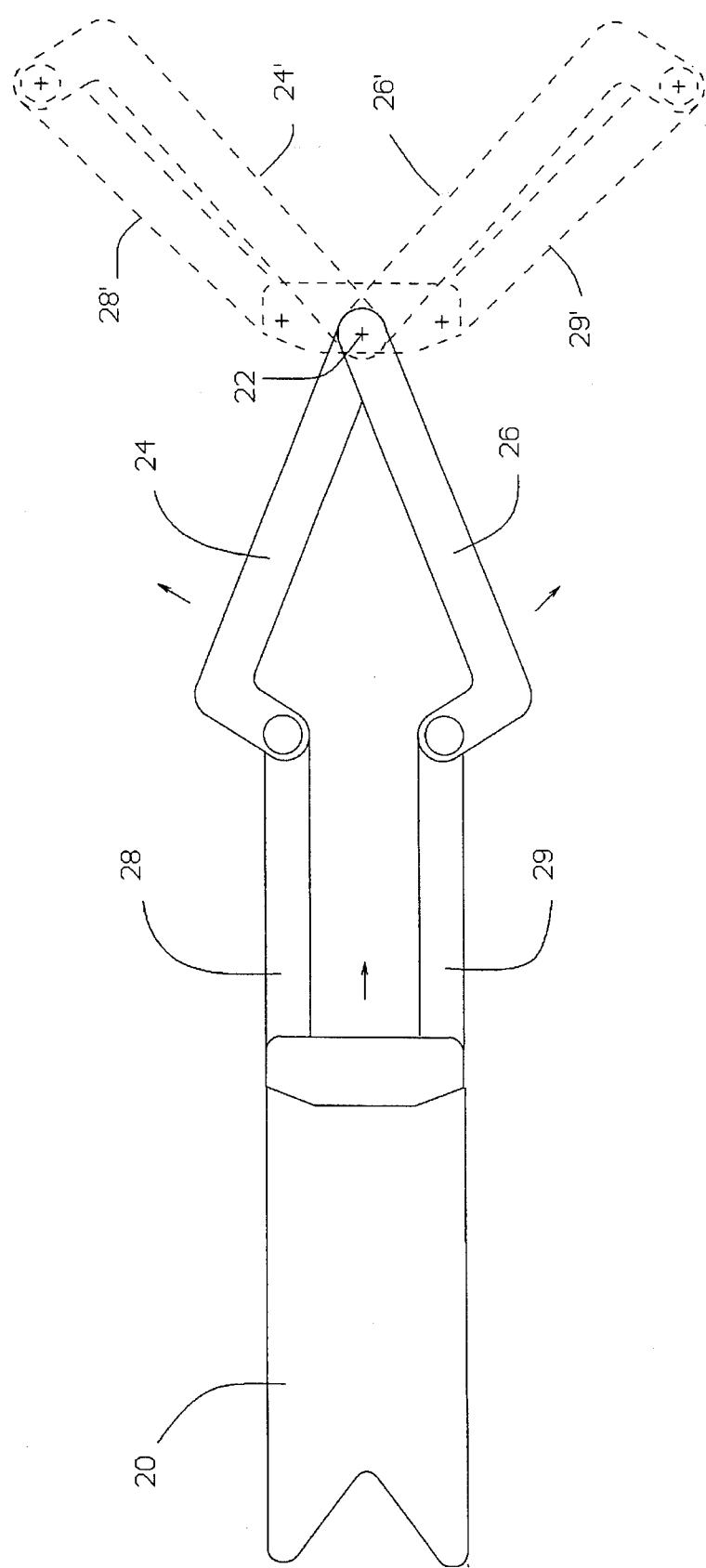
FIG. 2 is an enlarged plan view of a frogleg robot mechanism of the type that may be used in a central vacuum chamber of the processing system of FIG. 1.

The vacuum chamber robot 18 may be of any design capable of moving a substrate in two dimensions about the vacuum chamber 10. Since the processing chambers 12 are arrayed circularly about the vacuum chamber 10, a convenient robot design is one that operates in terms of polar coordinates, i.e. having an angular direction axis or bearing θ and a radius axis R. Such a mechanism is shown by way of example in FIG. 2.

The frogleg mechanism of the robot 18 comprises a workpiece support 20, sometimes referred to as an end effector, which can be moved radially and angularly with respect to an axis of rotation 22. In addition to the end effector 20 the mechanism includes four basic components: first and second proximal arms 24 and 26, both pivotally mounted for rotation about the axis 22, and first and second distal arms 28 and 29. The first distal arm 28 is pivotally connected by one end to the free end of the first proximal arm 24, and is pivotally connected by its other end to one side of the end effector 20. The second distal arm 29 is similarly connected to the free end of the second proximal arm 26 and to the other side of the end effector 20.

When the proximal arms 24 and 26 are rotated in opposite directions, as indicated by the arrows, and at the same angular velocity, the end effector 20 is moved toward the axis 22 along a radial path. When both proximal arms 24 and 26 are rotated in the same direction at the same angular velocity, the end effector 20 is also rotated about the axis 22, maintaining its radial distance from the axis. The normal sequence of operations of the robot mechanism includes fully extending the end effector 20 radially, to pick up a substrate or other part from a processing chamber, and then retracting the end effector, rotating it to a new processing chamber position, and extending it again to place the substrate in the new chamber. To minimize the vacuum chamber volume, it is often desirable to be able to retract the end effector 20 to a position substantially over the axis of rotation 22. The mechanism is shown in dashed lines a retracted position, with the components being referred to by primed reference numerals.

Robots have some mechanism for electrically encoding the robot position with respect to a home position. Some robots are driven by servo motors, of which the positions are controlled by a controller using position feedback signals from one or more sensing devices, such as optical encoders. In the case of the frogleg mechanism of FIG. 2, movement in the radial or R axis is effected by driving both motors, connected to the proximal arms 24 and 26, in opposite directions and at the same speed. Thus the absolute position of the robot on the R axis can be determined from the angular positions of the drive motors with respect to a predefined "home" position. The home position may be arbitrarily defined as the fully retracted position of the robot, with the robot oriented in a selected direction. Motor position counters, which may be set to zero in the home position, will subsequently reflect the R-axis and θ-axis position of the robot. Specifically, the R-axis position is proportional to the difference between the angular motor positions, as measured by the motor position counters. As long as the motors are rotated in the same direction and at the same speed, there is no change in the R-axis position. Similarly, the θ-axis position is proportional to the sum of the angular motor positions, as measured by the motor position counters. Of course, various factors, such as motor and drive mechanism gear ratios, must be taken into account in determining the true robot position.

The home position of a robot is established by any convenient means consistent with the specific design of the robot. For the frog-leg mechanism shown by way of example, the R-axis position depends on the relative position of the two proximal arms 24 and 26. These are driven by drive pulleys (not shown) beneath the frogleg mechanism. Therefore, one way of establishing a home position in the R axis is to install a sensor on one of these drive pulleys and a sensor flag on the other. The sensor and flag are positioned such that they are in alignment only when the mechanism is in its R-axis home position. The θ-axis home position can be defined by a fixed sensor (in the fixed frame of the mechanism) and a sensor flag installed on either of the drive pulleys, at a position corresponding to the θ-axis home position of the robot.

For the most part, movements of the robot to selected positions are defined relative to the home position. Although the home position provides a fixed reference point internal to the robot itself, calibration is still needed to account for discrepancies between the robot position and its operating environment. In the processing environment described with reference to FIG. 1, mounting of the robot 18 in the center of the vacuum chamber 10 may result in errors in position or orientation of the robot with respect to the chamber. Similarly, the processing chambers 12 may not be located precisely in their theoretical positions with respect to the vacuum chamber 10 and the robot 18.

In accordance with the invention, an automatic calibration procedure compensates for any difference between the actual and predicted positions of the robot 18 with respect to the vacuum chamber 10, and for any difference between the actual and predicted positions of a processing chamber 12 with respect to the robot. The first part of the calibration procedure, referred to as system calibration, may be used without the second, referred to as processing chamber calibration. However, processing chamber calibration requires that system calibration be first performed.

System Calibration:

System calibration uses a fixed sensor 36 installed in the floor of the vacuum chamber 10. The sensor 36 may be an infrared or other type of sensor capable of detecting the edge of an object passing over it. The position of the sensor 36 with respect to the robot 18 is theoretically known, but is subject to possible change during maintenance or reassembly of the robot 18 in the chamber 10. The system calibration procedure includes the steps of determining the actual position of the sensor 36 with respect to the robot 18, and then adjusting home position of the robot to account for any error.

Figure 7:
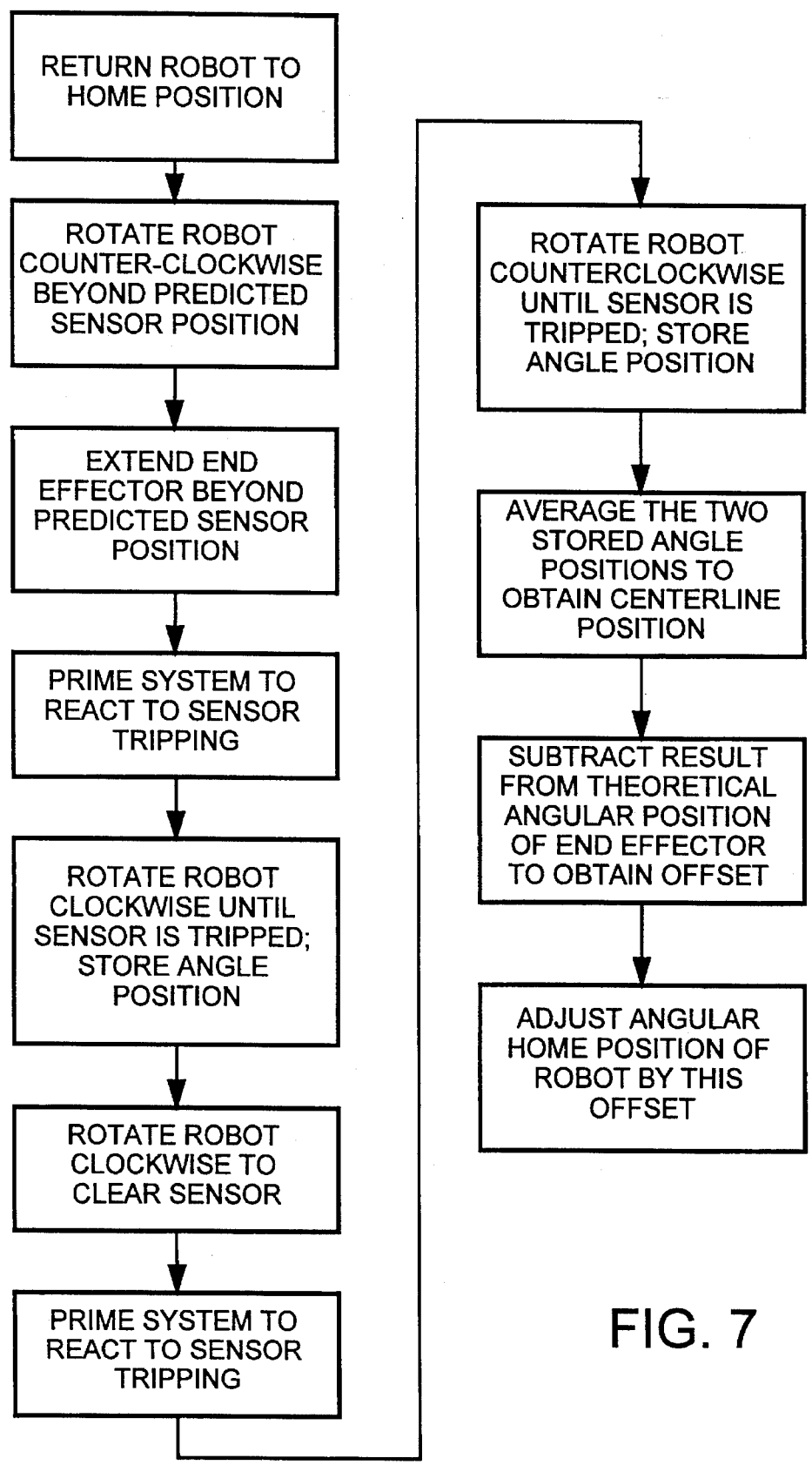
FIG. 7 is a flowchart of the functions performed by the invention in a system calibration of angular home position.

The following sequence of steps is performed for θ system calibration, as also shown in flowchart form in FIG. 7.

1. The robot returns to its home R-axis and home θ-axis position.

2. The robot rotates counter-clockwise to a position beyond the predicted sensor position.

3. The robot extends along the R axis to a point where the tip of the end effector 20 is beyond the predicted sensor position.

4. The system is primed to react to tripping of the sensor. (Normally the sensor plays no part in robot operation, so some action has to be taken to condition the robot control system to react to detection of the sensor's tripping.)

5. The robot rotates clockwise until the sensor 36 is tripped and the θ-axis position is stored. This position is shown in FIG. 3*a*.

6. The robot rotates clockwise until the sensor clears the end effector 20.

7. The system is again primed to react to tripping of the sensor.

8. The robot rotates counter-clockwise until the sensor is tripped and the θ-axis position is stored. This position is shown in FIG. 3*b*.

9. Calibration is performed by averaging the two θ-axis measurements, to obtain the angular position of the sensor with respect to the centerline of the end effector, and then subtracting the result from the theoretical θ-axis position of the sensor, which is 27° in the illustrative embodiment. This angular offset is used to adjust the θ-axis home position of the robot.

Figure 8:
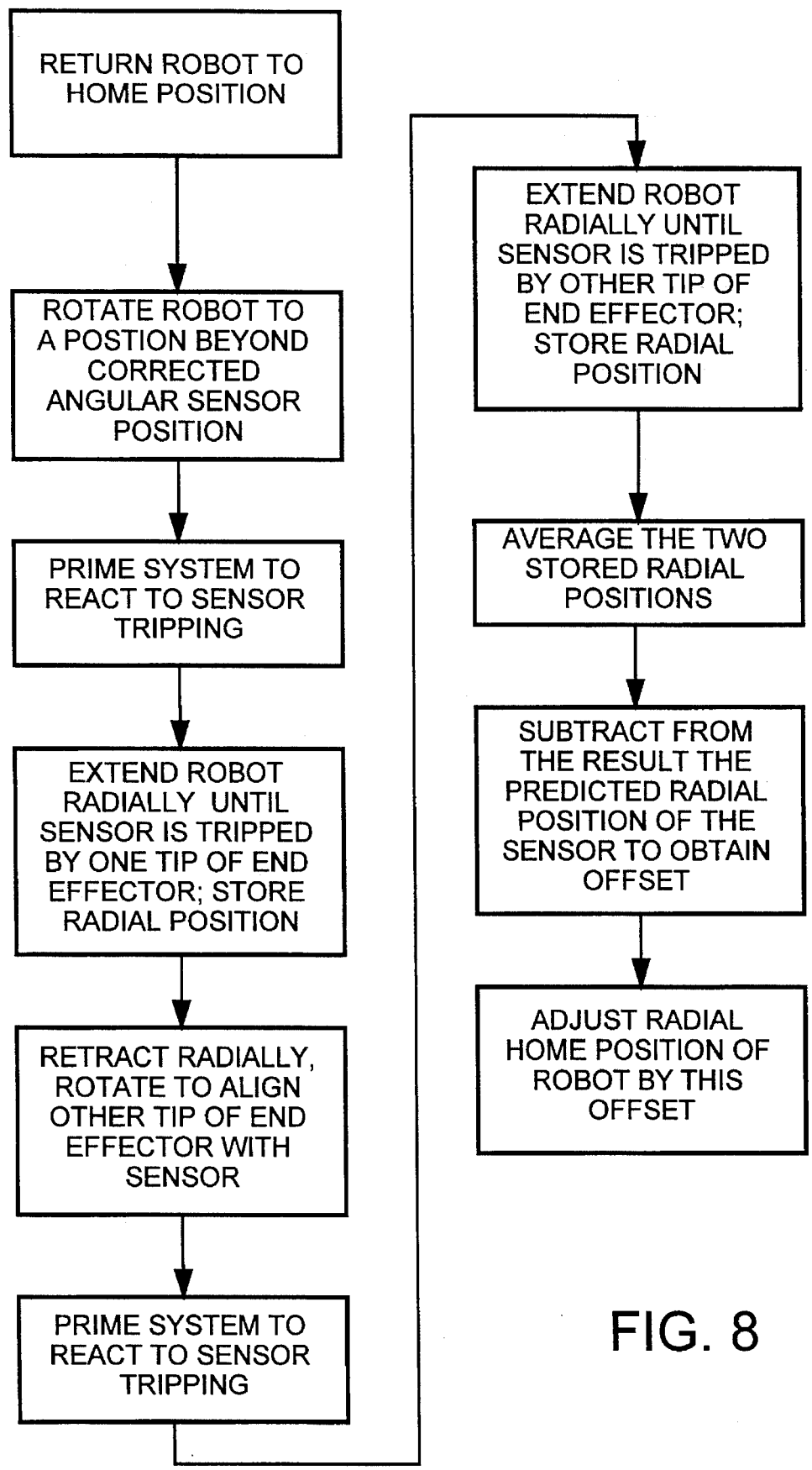
FIG. 8 is a flowchart of the functions performed by the invention in a system calibration of radial home position.

R-axis calibration is performed by a similar set of steps, which are performed after θ-axis calibration, as also shown in flowchart form in FIG. 8.

1. The robot retracts along the R axis to the home position.

2. The robot rotates to a position slightly beyond the corrected angular position of the sensor 36.

3. The system is primed to react to tripping of the sensor.

Figure 4B:
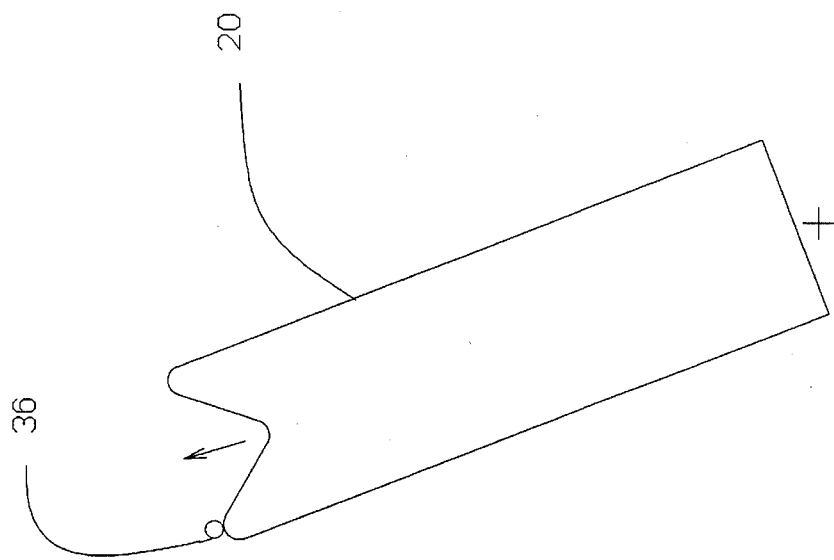
FIGS. 4a and 4b are simplified diagrams showing two important steps in a system radius calibration procedure in accordance with the invention.
Figure 4A:
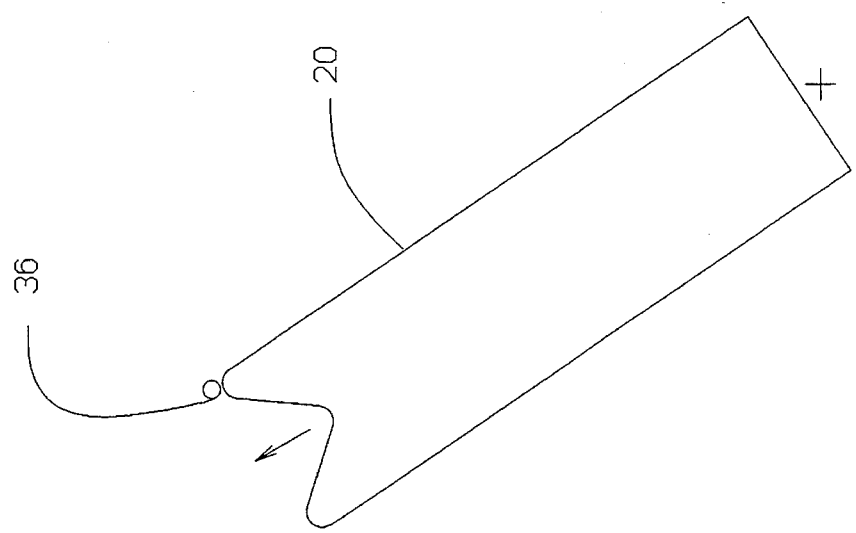

4. The robot extends radially until one tip of the end effector 20 trips the sensor 36 and the R-axis position is stored. This position is shown in FIG. 4*a*.

5. The robot retracts radially and rotates clockwise to a new position, angularly aligning the other tip of the end effector with the sensor 36.

6. The system is primed to react to tripping of the sensor.

7. The robot extends radially until the other tip of the end effector 20 trips the sensor 36 and the R-axis position is stored. This position is shown in FIG. 4*b*.

8. Calibration is performed by averaging the two detected R-axis positions, subtracting the predicted radial position of the sensor, and applying the result as a correction to the R-axis home position.

Completion of the system calibration procedure ensures that subsequent movements of the robot 18 within the vacuum chamber 10 will accurately reflect the true position of the chamber with respect to the robot.

Processing Chamber Calibration:

Since each processing chamber may be separately removed and reinstalled, system calibration does not necessarily ensure that the theoretical or initially determined positions of the chambers are accurate. Calibration with respect to each processing chamber is needed, for example, whenever the entire system is assembled or reassembled. Calibration of a single processing chamber may be needed if it is removed for replacement or maintenance.

Figure 9:
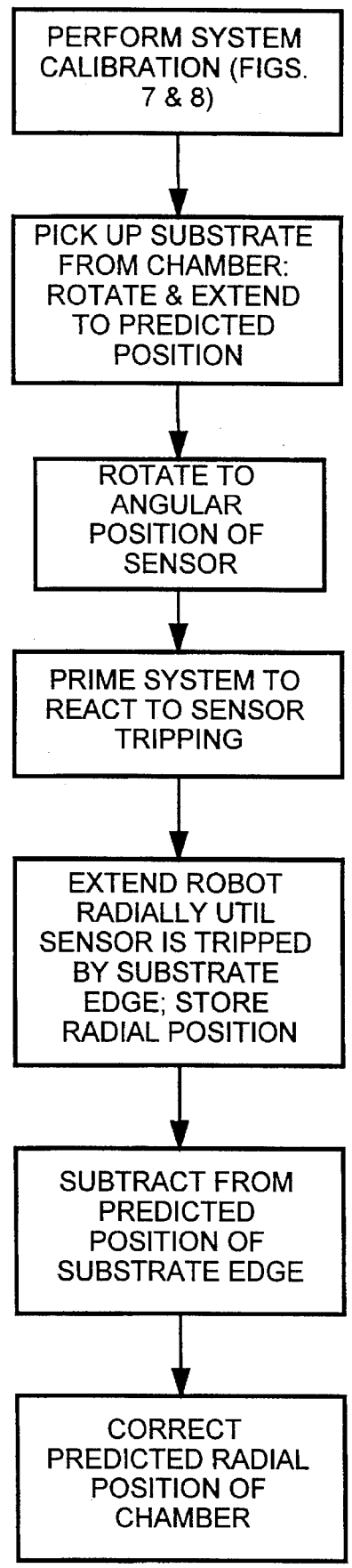
FIG. 9 is a flowchart of the functions performed by the invention in a processing chamber angular position calibration.

Processing chamber calibration uses the same sensor 36 as a measuring tool. To calibrate with respect to a specific chamber, a substrate is first placed in the chamber. Then the robot 18 picks up the substrate from the chamber and detects the substrate's position, using the sensor 36. Discrepancies from the predicted position are used to further calibrate the robot. Specifically, the following sequence of steps is followed for R-axis calibration, as also shown in flowchart form in FIG. 9.

1. System calibration is first performed, as described above.

2. The robot picks up a substrate from the chamber to be calibrated. In this procedure, the robot picks up the substrate in a "short" position, i.e. the end effector 20 does not extend beyond the farthest edge of the substrate. To pick up the substrate, the robot rotates to the predicted angular position of the chamber and extends radially to the predicted position of the substrate in the chamber. Any errors in the chamber position will result in the substrate's being positioned out of expected alignment with the end effector 20. For example, an angular position error for the chamber will result in the substrate's being off-center laterally with respect to the end effector 20. The robot retracts.

3. The robot rotates to the angular position of the sensor 36.

4. The system is primed to react to tripping of the sensor.

5. The robot extends along the R axis until the leading edge of the substrate trips the sensor 36 and stores the R-axis value. This position is shown in FIG. 5, wherein the substrate is indicated at 40. The radius at which tripping should occur is known from the size of the substrate and from the system calibration steps in which the end effector itself is used to trip the sensor.

6. The robot completes R-axis calibration by subtracting the tripping radius from the predicted position of the substrate edge and applying the result as a correction to the R-axis position of the chamber.

Figure 10:
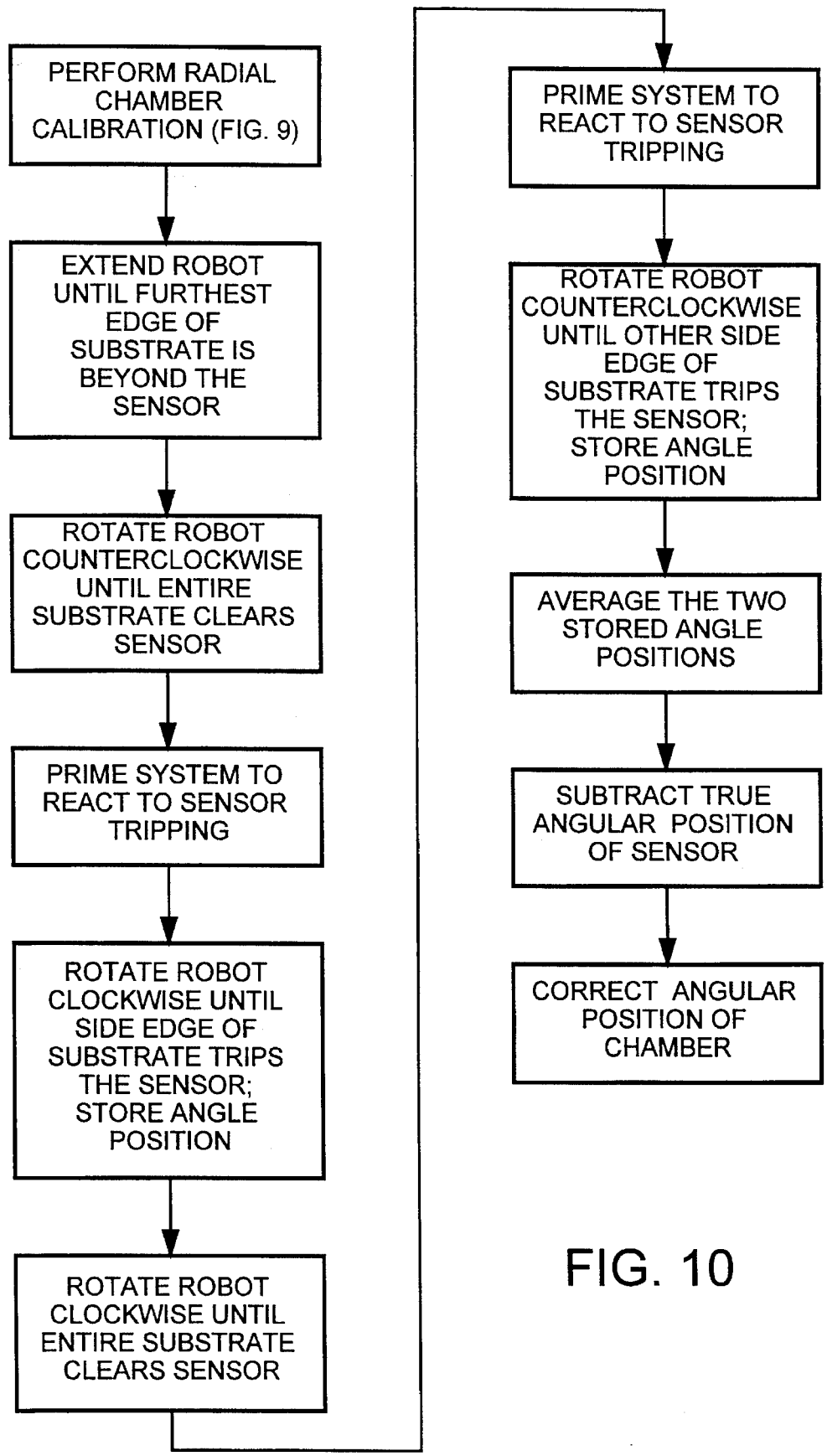
FIG. 10 is a flowchart of the functions performed by the invention in a processing chamber radial position calibration.
Figure 11:
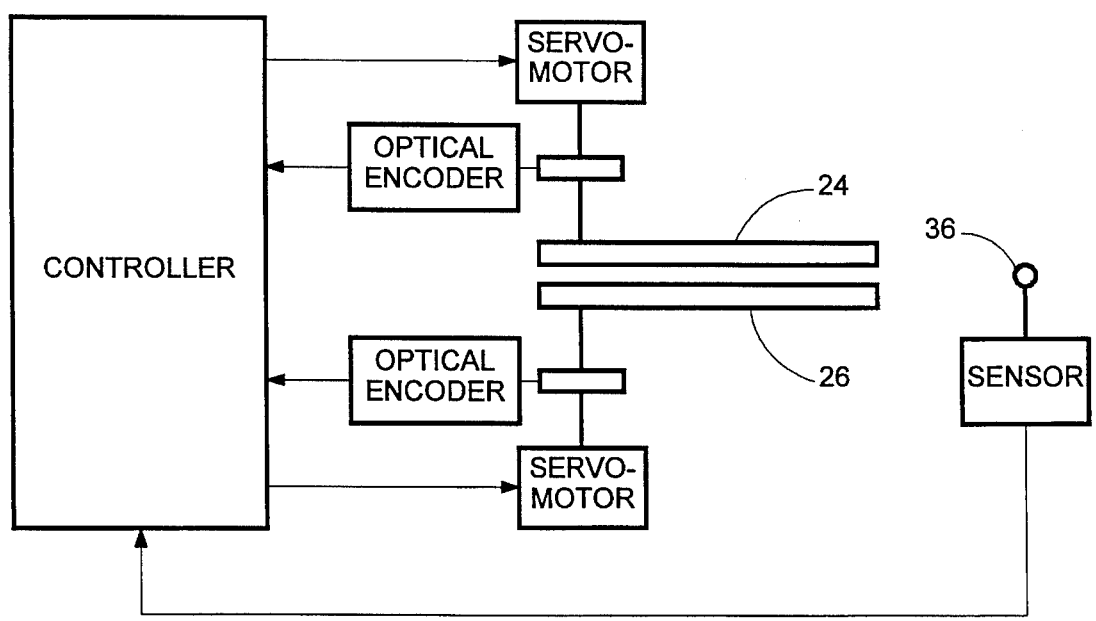
FIG. 11 is a block diagram showing the invention apparatus.

Chamber calibration in the θ axis is performed by the following sequence of steps, as also shown in flowchart form in FIG. 10.

1. The robot extends along the R axis to a point at which the furthest edge of the substrate is beyond the sensor 36.

2. The robot rotates to an angular position at which the entire substrate is located counterclockwise from the sensor 36.

3. The system is primed to react to tripping of the sensor.

4. The robot rotates clockwise until a side edge of the substrate trips the sensor 36 and the angular position is stored. This position is shown in FIG. 6*a*.

5. The robot rotates to an angular position at which the entire substrate is located clockwise from the sensor 36.

6. The system is primed to react to tripping of the sensor.

7. The robot rotates counterclockwise until the opposite side edge of the substrate trips the sensor 36 and the angular position is stored. This position is shown in FIG. 6*b*.

8. The two angular positions are averaged and calibration is completed by subtracting the true angular position of the sensor 36 (27°) and applying the result as a correction to the angular position of the processing chamber.

After calibration, substrates will be placed in the chamber in proper alignment because the angular and radial position of the chamber is now more accurately known by the robot. The procedure may have to be repeated for the other processing chambers.

Conclusion:

It will be appreciated from the foregoing that the present invention represents a significant advance in the field of robots for moving substrates from one chamber to another. In particular, the invention provides for automatic calibration of a vacuum chamber robot to compensate for differences between the actual and predicted positions of the robot with respect to a chamber in which it is installed, and between the actual and predicted positions of a processing chamber with respect to the robot. This method minimizes down time due to robot repair or chamber repair when compared to robot "teaching" calibration methods typically used in the industry. It will also be appreciated that, although a specific embodiment of the invention has been described in detail by way of illustration, various modifications may be made without departing from the spirit and scope of the invention. Accordingly, the invention should not be limited except as by the appended claims.

I claim:

1. A method for automatically calibrating a robot capable of movement in two position axes and installed in a robot chamber, comprising the steps of:

moving a robot component to a position adjacent to a fixed sensor in the robot chamber;

moving the robot component along a selected position axis and across the fixed sensor;

detecting when at least one feature of the robot component trips the fixed sensor, and recording a robot position in the selected position axis along which the robot was moved across the fixed sensor;

computing the difference between the robot position recorded in the immediately preceding recording step and a predicted robot position at which the fixed sensor should be tripped;

applying the difference value computed in the immediately prior computing step to calibrate the robot in the selected position axis; and repeating all of the foregoing steps for another selected position axis of the robot.

2. A method as defined in claim 1, and further comprising the steps of:

picking up a workpiece from a selected processing chamber adjoining the robot chamber;

moving the workpiece across the fixed sensor along each position axis in turn;

detecting at least one feature of the workpiece as the workpiece is moved across the fixed sensor along each position axis;

computing the difference, for each position axis, between the position of the workpiece detected in the immediately preceding detecting step and a predicted position of the workpiece; and applying the differences obtained from the immediately prior computing step, to adjust a predicted position of the selected processing chamber.

3. A method for automatically calibrating a robot capable of movement in two axes and installed in a robot chamber, the robot being capable of moving a substrate support angularly and radially with respect to an axis, the method comprising the steps of:

moving the robot to an angular position such that the substrate support is positioned adjacent to a fixed sensor in the robot chamber;

moving the substrate support angularly across the fixed sensor;

detecting when at least one edge of the substrate support trips the fixed sensor, and recording an angular position of the robot;

computing the difference between the angular position of the robot recorded in the immediately preceding recording step and a predicted robot angular position at which the fixed sensor should be tripped;

applying the difference value computed in the prior immediately computing step to calibrate the robot in angular position;

moving the substrate support such that a front edge of the substrate support is adjacent to the fixed sensor;

moving the substrate support radially out across the fixed sensor;

detecting when at least one feature of the front edge of the substrate support trips the fixed sensor and recording a radial position of the robot;

computing the difference between the radial position of the robot recorded in the immediately preceding recording step and a predicted robot radial position at which the fixed sensor should be tripped; and applying the difference value computed in the immediately prior computing step to calibrate the robot in radial position.

4. A method as defined in claim 3, wherein:

the step of detecting when at least one edge of the substrate support trips the fixed sensor, when moving the substrate support angularly across the fixed sensor, includes detecting when each of two opposite side edges of the substrate support trips the fixed sensor, determining angular positions corresponding to detection of tripping the fixed sensor by the two opposite side edges of the substrate support, and averaging the two angular positions.

5. A method as defined in claim 3, wherein:

the step of detecting when at least one feature of the front edge of the substrate support trips the fixed sensor includes detecting when each of two leading tips of the front edge trips the fixed sensor, determining angular positions corresponding to detection of tripping of the fixed sensor by the two leading tips of the front edge, and averaging the two radial positions.

6. A method as defined in claim 3, and further comprising the steps of:

picking up a substrate from a selected processing chamber adjoining the robot chamber;

moving the substrate across the fixed sensor in a radial direction;

detecting at least one edge of the substrate as the substrate is moved radially across the fixed sensor and thereby deriving a detected radial position of the substrate;

computing the difference between the detected radial position of the substrate and a predicted radial position of the substrate;

applying the difference obtained from the immediately prior computing step, to adjust a predicted radial position of the selected processing chamber;

moving the substrate angularly across the fixed sensor;

detecting at least one edge of the substrate as the substrate is moved angularly across the fixed sensor and thereby deriving a detected angular position of the substrate;

computing the difference between the detected angular position of the substrate and a predicted angular position of the substrate; and applying the difference obtained from the immediately prior computing step, to adjust a predicted angular position of the selected processing chamber.

7. A method as defined in claim 6, wherein:

the step of detecting at least one edge of the substrate as the substrate is moved angularly across the fixed sensor includes detecting each of two opposite side edges, determining angular positions corresponding to tripping of the fixed sensor by the two opposite side edges, and averaging the two angular positions.

8. Apparatus for automatically calibrating a robot capable of movement in two axes and installed in a robot chamber, comprising:

a robot mechanism installed in a robot chamber and including a movable workpiece support and means for moving the workpiece support in at least two dimensions;

a sensor fixed to the robot chamber in a known position;

means for moving the workpiece support to a position adjacent to the sensor;

means for next moving the workpiece support along a first position axis and across the sensor;

means for detecting when at least one feature of the workpiece support trips the sensor, and recording a robot position in the first position axis;

means for computing the difference between the robot position in the first position axis recorded in the immediately preceding means for detecting and recording, and a predicted robot first-axis position at which the sensor should be tripped;

means for applying the difference value computed in the means for computing, to calibrate the robot in the first position axis;

means for next moving the workpiece support along a second position axis and across the sensor;

means for detecting when at least one feature of the workpiece support trips the sensor, and recording a robot position in the second position axis;

means for computing the difference between the robot position in the second position axis recorded in the immediately preceding means for detecting and recording, and a predicted robot second-axis position at which the sensor should be tripped; and means for applying the difference value computed in the immediately preceding means for computing, to calibrate the robot in the second position axis.

9. Apparatus as defined in claim 8, and further comprising:

means for picking up a workpiece from a selected processing chamber adjoining the robot chamber;

means for moving the workpiece across the sensor along each position axis in turn;

means for detecting at least one feature of the workpiece as the workpiece is moved across the sensor along each position axis;

means for computing the difference, for each position axis, between the position of the workpiece detected by the means for detecting at least one feature of the workpiece and a predicted position of the workpiece; and means for applying the differences obtained from the means for computing the difference between the position of the workpiece and the predicted position of the workpiece, to adjust a predicted position of the selected processing chamber.

10. Apparatus for automatically calibrating a robot capable of movement in two axes and installed in a robot chamber, the apparatus comprising:

means for moving a substrate support in the robot to a selected angular position and a selected radial position with respect to a fixed axis;

a sensor fixed in the robot chamber, and capable of detecting the presence of the edge of an object moved across the sensor; and calibration control means, including:

means for moving the substrate support to an angular position adjacent to the sensor;

means for moving the substrate support angularly across the sensor;

means for detecting when at least one edge of the substrate support trips the sensor, and recording an angular position of the robot;

means for computing the difference between the angular position of the robot recorded in the immediately preceding means for detecting and recording, and a predicted robot angular position at which the sensor should be tripped, and applying this difference value to calibrate the robot in angular position;

means for moving the substrate support such that a front edge of the substrate support is adjacent to the sensor;

means for moving the substrate support radially out across the sensor;

means for detecting when at least one feature of the front edge of the substrate support trips the sensor and recording a radial position of the robot; and means for computing the difference between the radial position of the robot recorded in the immediately preceding means for detecting and recording, and a predicted robot radial position at which the sensor should be tripped, and applying this difference value to calibrate the robot in radial position.

* * * * *